Dec. 27, 1966  C. T. ALTFATHER  3,295,019
PHASE COMPARISON RELAYING DEVICE
Filed June 29, 1964  3 Sheets-Sheet 1
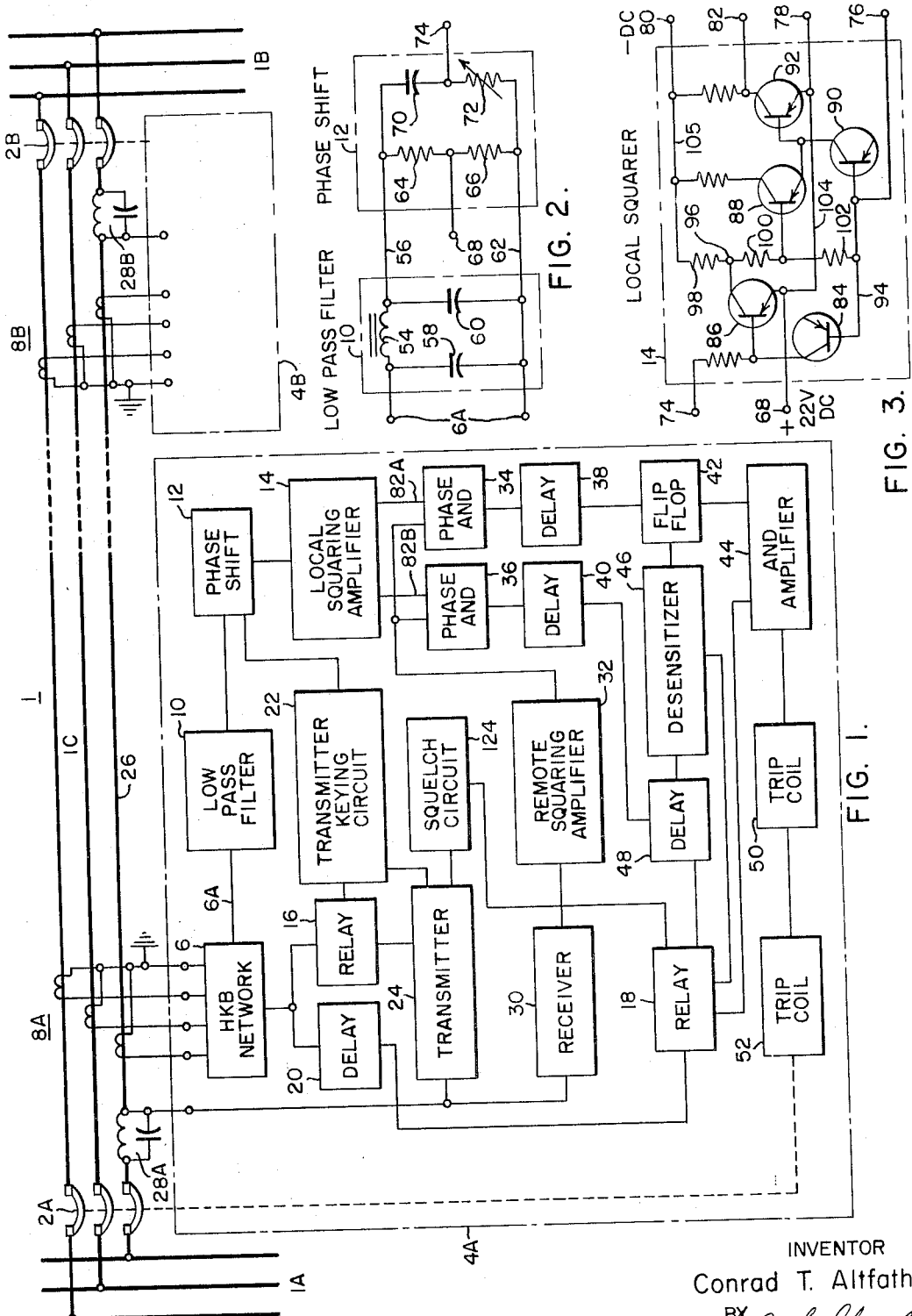
INVENTOR
Conrad T. Altfather
BY John L. Stoughton
ATTORNEY Dec. 27, 1966          C. T. ALTFATHER                3,295,019
                 PHASE COMPARISON RELAYING DEVICE
Filed June 29, 1964                              3 Sheets-Sheet 2
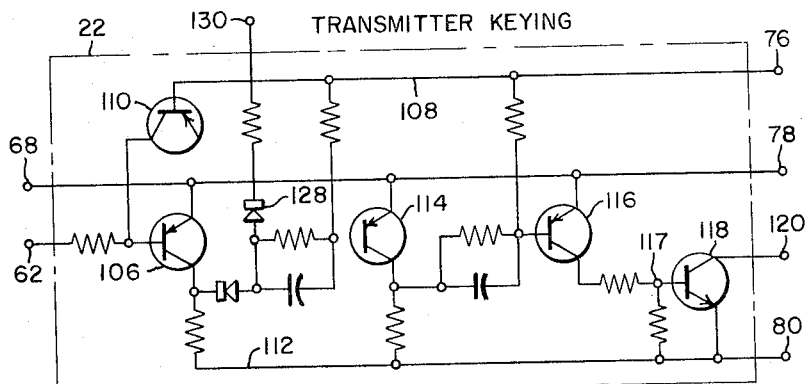
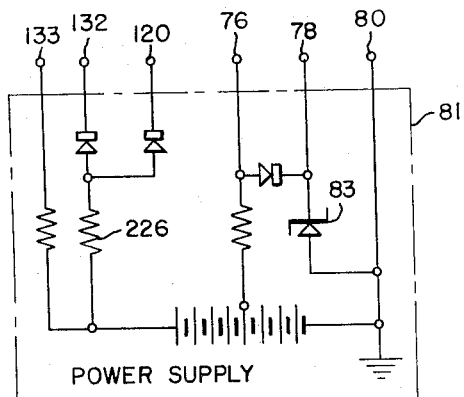
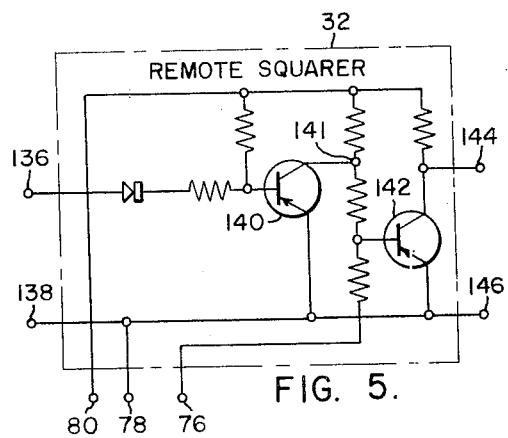
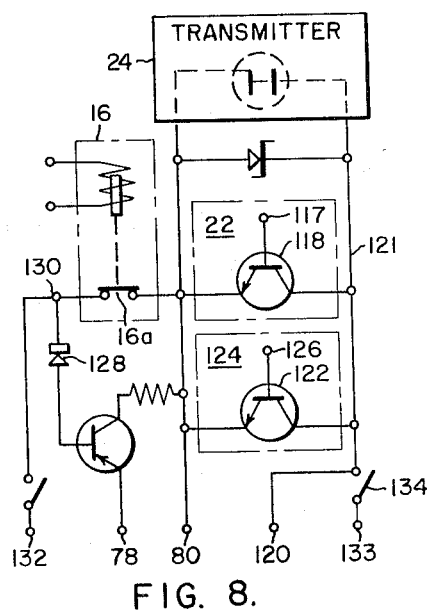
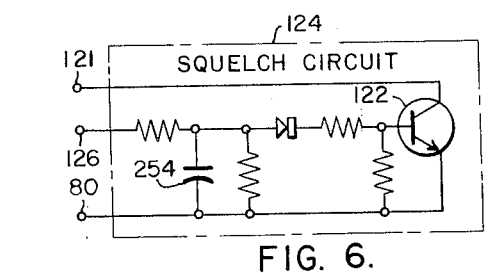
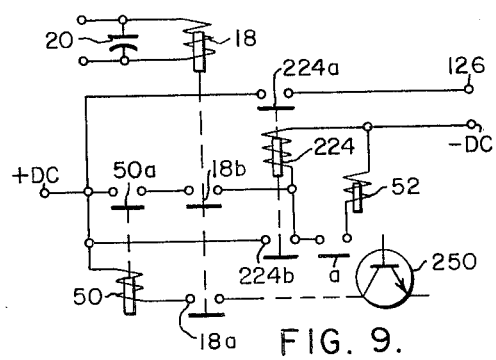

Dec. 27, 1966     C. T. ALTFATHER     3,295,019
PHASE COMPARISON RELAYING DEVICE
Filed June 29, 1964     3 Sheets-Sheet 3

United States Patent Office 3,295,019
Patented Dec. 27, 1966

3,295,019
PHASE COMPARISON RELAYING DEVICE
Conrad T. Altfather, Basking Ridge, N.J., assignor to Westinghouse Electric Corporation, Pittsburgh, Pa., a corporation of Pennsylvania
Filed June 29, 1964, Ser. No. 378,552
18 Claims. (Cl. 317—27)

This invention relates generally to phase comparison carrier relaying devices and more particularly to the high speed operation of such relaying devices.

In the high speed operation obtained with phase comparison carrier relaying the relay is susceptible to incorrect operation because of transients, as for example those which may be produced at the time of fault clearing. It is desirable therefore to block the relaying action in an unfaulted line section when the fault occurs in the adjoining section. To accomplish this, the relaying device is provided with a brief but sufficient time for the relaying device to determine whether the fault is internal or external. When the fault has been determined as being external to the section protected by the subject relay the subject relay should be temporarily disabled until sufficient time has elapsed for the relays in the adjoining section to disconnect the faulted sections, but such disabling should not prevent the actuations of the relay in the event of the occurrence of a subsequent internal fault in the protected section.

It is an object of this invention to provide a high speed relaying apparatus which will be highly sensitive to the occurrence of an internal fault in the protected section but protected from false operations due to the occurrence of an external fault.

It is another object of the invention to provide means temporarily for rendering the apparatus ineffective subsequent to the occurrence of an external fault.

Another object of this invention is to provide such a relay apparatus in which the relay is initially sensitized upon the occurrence of a fault for operation if the fault proves to be an internal fault and thereafter is rendered less sensitive when the fault is external to permit the clearing of the external fault without tripping of the unfaulted protected section.

A further object of this invention is to provide in such a relaying system, means for rapidly reestablishing the sensitivity of the relay in the event of the occurrence of an internal fault subsequent to the occurrence of an external fault and to the desensitization of the relaying apparatus.

Other objects of the invention will be apparaent from the description, the appended claims and the drawings in which:

FIGURE 1 is a block diagram of a relaying apparatus embodying the invention;

FIGS. 2, 3, 4, 5 and 6 are also schematic circuits which may be used in the blocks of the block diagram of FIG. 1;

FIG. 7 represents schematically a suitable power supply;

FIGS. 8 and 9 are partial schematic circuits useful in understanding the invention; and, FIG. 10 is a combined schematic representation of a plurality of the blocks shown in FIG. 1 by which the proper sensitization and desensitization of the trip relay controlling circuitry is accomplished.

Figure 10:
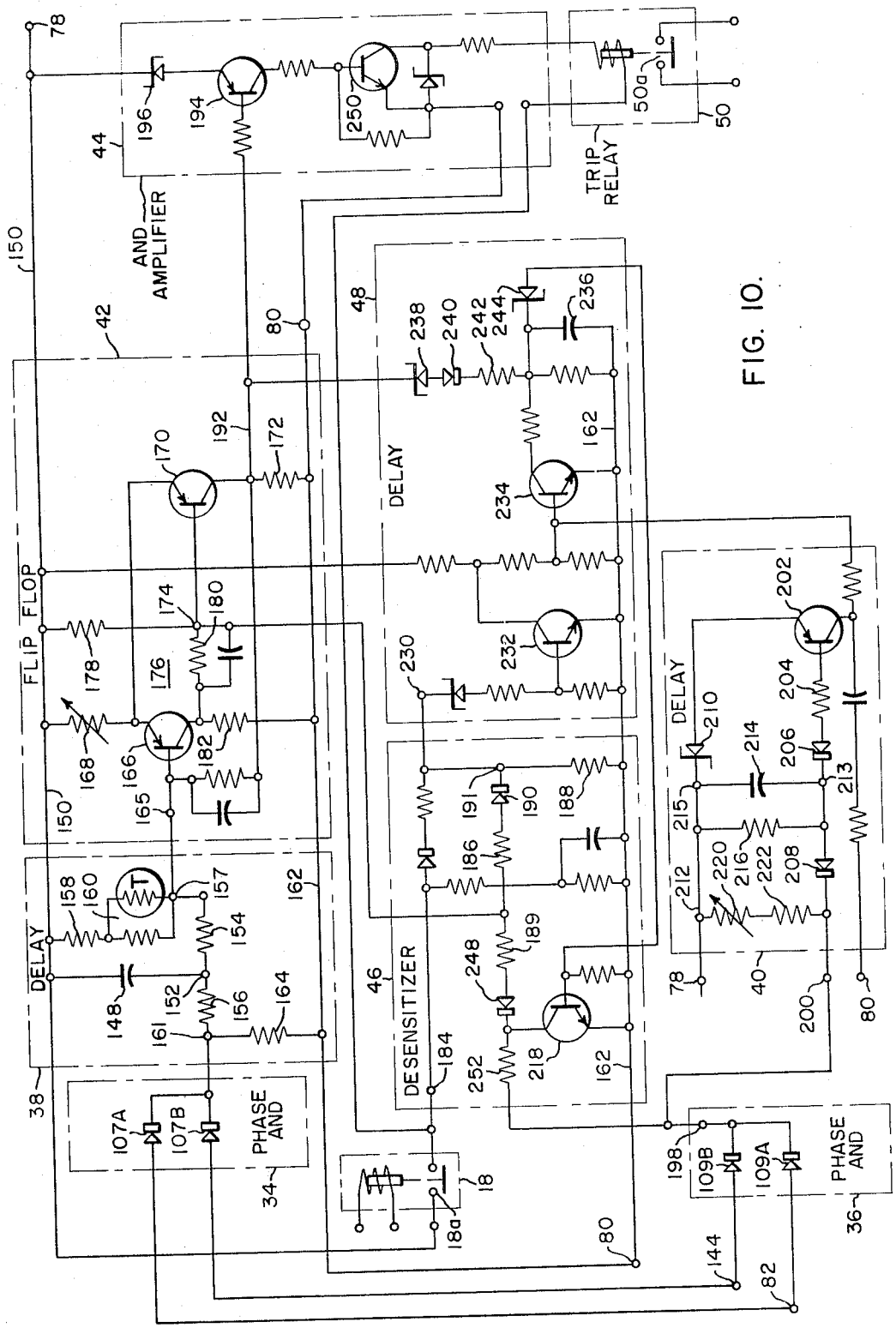

Referring to the drawings by characters of reference, the numeral 1 represents generally a three-phase power distribution network comprising a first section 1A, which may be suitably energized from a source of electrical energy, a second section 1B, which also may be suitably energized from another source of electrical energy, and a protected section 1C which is connected by means of breakers 2A and 2B with the network portions 1A and 1B respectively.

The breakers 2A and 2B are controlled by relaying devices 4A and 4B which sense the presence of a fault in the distributing network or system 1. Each of the relaying devices 4A and 4B include a network 6 which is energized as a function of the fault quantity at the ends of the line section 1C. Since both of the relaying devices 4A and 4B are identical, only the device 4A is shown in block form. It is to be understood that the other device 4B is constructed similarly.

The network 6 may take many desired forms in which a single phase alternating potential output signal representative of a fault quantity is provided. For full utilization of the invention, the output of the network 6 should indicate the direction of the fault quantity. Such a network 6, identified in applicant's drawing as an HKB network, could be like the HCB network shown and described in Lensner Patent No. 2,406,615. The networks 6 are energized by means of transformer arrays 8A and 8B and provide an alternating potential output signal (as for example that taken between the terminals 19 and 20 of said Lensner patent) which is supplied through a low pass filter 10 and a phase shifting network 12 (FIG. 2) to a local squaring amplifier 14 which squares up and amplifies the signal applied thereto. The phase of the output signal is dependent upon the direction of the fault quantity at the location of the transformer array which energizes the particular HKB network 6.

As illustrated in said Lensner patent the HKB network 6 may have a unidirectional potential signal component that is supplied by the rectifier network 23 of the said Lensner patent. This latter signal component is supplied to a pair of relays 16 and 18; the relay 18 being supplied through a delay network 20 so that the relay 16 will always operate at least a predetermined time interval prior to operation of the relay 18. In many instances it is desirable to adjust the relay 18 so that it will operate at a somewhat higher output voltage of the HKB network than is required for operation of the relay 16.

When the relay 16 operates, it transfers the control of a suitable transmitter 24 which is of the type which provides a carrier signal which may be switched on and off by a suitable network such as the illustrated transmitting keying circuit 22. The transmitter 24 is for the purpose of supplying the relaying device 4B with intelligence concerning the fault quantity as determined by the relaying device 4A. As illustrated, the output or carrier signal of the transmitter 24 is applied to one of the conductors of the line section 1C as for example conductor 26. The signal could of course be transmitted as an airborne radio signal or along a separate pilot wire or otherwise as long as the intelligence reaches the relaying device 4B. The output signal of the transmitter 24 is prevented from entering the line portions or sections 1A and 1B by the filter networks 28A and 28B which networks readily pass the low frequency (for example 60 cycles per second) power through the network 1 but substantially completely block the flow of the higher frequency output of the transmitter 24. The transmitter keying circuit 22 is held in a condition to prevent the transmitter 24 from transmitting an output signal until operation of the relay 16.

The relaying devices 4A and 4B are each provided with a receiver such as the receiver 30 of the device 4A. The receiver 30 is tuned to receive the output signal from the transmitter of the relaying device 4B which corresponds to the transmitter 24 and vice versa. Under some conditions the transmitters of the relaying devices are tuned to different frequencies so that the receivers will not receive the signal transmitted by the transmitter of the same relaying device. In other instances both transmitters are tuned to the same frequency and the local receiver will receive the signals of the local transmitter as well as the signals of the remote transmitter. The output of the receiver 30 is applied to a remote squaring amplifier 32 which squares the receiver signal.

The output signals of the local and remote squaring amplifiers 14 and 32 are each supplied to a pair of phase AND networks 34 and 36 which, as will be explained below in greater detail, serve to pass an effective signal to the respective delay networks 38 and 40, respectively, when the relative phase angle between the output signals of the amplifiers 14 and 32 is below a predetermined magnitude and to prevent such a passage and consequent timing out of the delay networks when the phase angle is greater than this predetermined magnitude.

The delay network 38 is connected to actuate a flip-flop or switching network 42 which controls one input of an AND amplifier 44. The other input of the amplifier 44 is controlled by the relay 18, which prevents any false signal from the flip-flop 42 from tripping the trip relay 50 and thereby the breaker 2A unless the fault quantity has caused the relay 18 to operate.

The output of the delay network 40 is supplied to a desensitizing network 46 through a delay network 48. As will be explained in greater detail below, the desensitizing network 46 normally maintains the flip-flop 42 ineffective to switch and provide a signal for operation of the AND amplifier 42 during periods when the network 1 is not faulted. In the event of a fault of sufficient magnitude to operate the relay 18, the desensitizing network 48 is promptly actuated to sensitize the flip-flop 42 to respond to the output signal, if any, of the delay network 38. If the fault is internal to the sections 1C, the phase of the signals supplied by the amplifiers 14 and 32 is not greater than the predetermined critical angle and after a delay of about .004 second a signal indicative of an internal fault within the protected line section 1C is supplied to the AND amplifier 44.

If however, the fault which caused operation of the relay 18 is external to the line section 1C, the delay network will not time out. In this event, it is desired that the desensitizing network 46 be returned to its initial position for desensitizing the flip-flop network 42 so that it will not respond to spurious or transient signals which might be transmitted through the delay network 38. In order that the relay apparatus 4A may respond to a subsequent internal fault, the delay network 48 is connected to be reset to its non-timed-out or initial condition by the timing out of the delay network 40. This resetting actuates the desensitizing network 46 to sensitize the flip-flop network 42. Since the delay network 40 can time out only because of the actuation of the phase AND network 36, and the phase AND network 36 can only be actuated for this purpose in the event of the occurrence of a local fault within the protected line section 1C, the flip-flop 42 will be resensitized only if a local fault occurs and will not be resensitized by the external fault.

The trip relay 50 is connected to control the operation of the breaker trip coil 52 which when energized will open the contacts of the breaker 2A to disconnect the section 1C from the power section 1A.

The low pass filter 10 may take any desired form in which electrical signals having a frequency at or below the critical frequency of the filter may be passed therethrough. In the illustrated form shown in FIG. 2, this low pass filter is of pi-type and includes an inductance 54 series connected in the conductor 56 and a pair of capacitors 58 and 60 which are individually connected from opposite ends of the inductance 54 to the other conductor 62. The signal passed by the filter 10 is supplied to the phase shift network 12 which may take any of many varied forms but which is illustrated in FIG. 2 as comprising a pair of series connected resistors 64 and 66 and a capacitor 70 series connected with a variable resistor 72. The series circuits are connected between the conductors 56 and 62 and provided with an output terminal 68 at the common point of the resistors 64 and 66 and an output terminal 74 between the capacitor 70 and variable resistor 72. By varying the magnitude of the resistance of the resistor 72, the phase of the output voltage at the terminals 68 and 74, with respect to that of the voltage between the conductors 56 and 68, may be controlled.

The output voltage from the terminals 68 and 74 is applied to the like numbered terminals 68 and 74 of the local squaring amplifier 14. For purposes of simplicity the terminals which are connected together will be designated by the same reference characters whereby the interconnecting of the figures will be apparent. The amplifier 14 (FIG. 3) may take any of many varied forms in which the input signal is amplified and squared and supplied to a pair of output terminals 81 and 82. In the illustrated embodiment, the local square 14 comprises a plurality of transistors 84, 88, 90 and 92. Power for the amplifier is provided from the terminals 78 and 80 of a power supply or source 81. The terminal 80 as indicated is the minus D.C. terminal and may be ground. The terminal 78 is supplied with a regulated positive direct current potential which for example may be maintained at 22 volts and may be derived through a voltage dropping resistor from a 45 volt tap of a suitable battery such as a station battery under control of a Zener diode 83. The supply 81 is also provided with an output terminal 76 which is connected to the like numbered terminal of the squarer 14. The local squarer 14 is rendered substantially unaffected by changes in the temperature thereof by the transistor 86, the base of which is connected to the terminal 76 through the collector and base of the transistor 84 and conductor or bus 94. It will be noted that the emitter of this transistor 84 is not connected. Similarly the base of the transistor 92 is connected through the emitter and base of the transistor 90 to the bus 94.

The conduction of the transistor 86 is controlled by the output of the phase shift network 12 and is arranged to conduct during the half cycle output of the phase shift network 12 in which the input terminal 74 is negative with respect to the input terminal 68. When the transistor 86 conducts, collector current flows through the transistor 86 and effectively connects the terminal 96 intermediate the resistors 98 and 100 of the series connected resistors 98, 100 and 102 to the positive bus 104. The resistors 98, 100 and 102 are connected between the ground or negative bus 105 and the positive bus 94. Therefore the conduction of the transistor 86 connects the terminal 96 to the bus 104, and thereby raises the potential of this terminal 96 sufficiently above the potential of the 22 volt bus 104 so that transistors 88 and 92 become nonconducting. When transistor 92 becomes nonconducting, the potential of the output terminal 82 becomes substantially that of the negative potential bus 80.

When transistor 86 is blocked by the output potential of the phase shifter 12, the potential of the terminal 96 is reduced sufficiently below that of the bus 104 to cause transistors 88 and 92 to conduct, thereby raising the potential of the output terminal 82 to approximately that of the bus 104 whereby current is caused to flow through corresponding diodes 107 and 109 of the phase AND network 34 and 36 as will be explained in greater detail below.

The transmitter keying circuit 22 (FIG. 4) is actuated by the electrical quantity flowing through the low pass filter 10 and the resistor 66 of the network 12 as indicated by the like numbered input terminals 62 and 68 of the transmitter keying network 22. Power for the keying network is obtained from the power supply 81 (FIG. 7) from the like numbered power input terminals 76, 78 and 80. The circuit 22 is rendered nonresponsive to temperature changes by connecting the base of transistor 106 to the bus 108 through the collector and base of a transistor 110.

During one-half cycle of the input voltage supplied to the input terminals 62 and 68, the transistor 106 conducts, and during the opposite half cycle it is rendered nonconducting. When the transistor 106 is nonconducting the potential of its collector is substantially at that of the negative potential bus 112 whereby the transistor 114 is maintained conducting. When the transistor 114 conducts, the transistor 116 and 118 are held nonconducting and the output connection or terminal 120 is disconnected from the negative or ground bus 80. The opening of the circuit between the terminal 120 and bus 80 permits the transmitter to transmit its output signal provided the transistor 122 of the squelch circuit 124 is also nonconducting (FIG. 8). The keying circuit 22 is provided with a control terminal 130, which in the absence of a fault, is connected through normally closed contacts 16a of relay 16 to the ground bus 80. This connection maintains the transistor 114 normally conducting and prevents any conduction of the transistor 118 and reduction of the potential of bus 121 due to operation of the keying circuit 22 but permits operation of the transmitter 24 by control of the switch 134 which may be manually operated to energize the transmitter from source terminal 133 for test or other purposes without preventing operation of the transmitter 24 for fault purposes.

The squelch circuit 124 is for the purpose of preventing operation of the local transmitter for a predetermined interval after operation of the local breaker. The circuit 124 is provided with an input terminal 126 which as shown in FIG. 9 is normally disconnected by the normally open contacts of relay 224a from a source of turn-on base current. The transistor 122 is therefore maintained nonconducting and has no effect on the operation of the transmitter 24 until energization of both of the relays 18 and 50. When once rendered conducting (to render the transmitter 24 ineffective to transmit its signal) as a consequence of an internal fault, it will remain conducting for a predetermined time interval after the opening of the a contacts of breaker 2A because of the timing effect of the capacitor 254.

The receiver 130 is tuned to receive the output signal of the transmitter of the relaying device 4B and, if both transmitters have the same output frequency, that of the local transmitter. When the receiver 30 receives a signal, its output is energized to supply a signal to the input terminals 136 and 138 of the remote squaring amplifier 32. This signal acts to cycle the normally conducting transistor 140 whereby it pulsatingly energizes its ouput terminals 144 and 146 with a square voltage wave. Power for operating the remote squaring circuit 30 is derived from the power supply 81 as indicated by the terminals designated 76, 78 and 80. When the normally conductive transistor 140 is blocked, the potential of terminal 141 is sufficiently low to permit the flow of base current through the transistor 142 to hold the potential of the output terminal 144 at substantially that of the positive supply terminal 78. When the potential across the input terminals 136 and 138 reverses, transistor 140 will conduct, the potential of the terminal 141 will be raised to substantially that of the positive terminal 78 and transistor 142 will be rendered nonconducting whereby the potential of terminal 144 is reduced to substantially that of the negative terminal 80. The terminal 144 is connected with an input terminal to each of the phase AND networks 34 and 36.

Referring now more specifically to FIG. 10 of the drawings wherein the details of other of the circuits are illustrated, it will be apparent that the phase AND circuits 34 and 36 are substantially identical and each is provided with two input terminals and a single output terminal. The input terminals are connected to the output terminals through individual diodes (107a, 107b, 109a and 109b) whereby only the positive half cycles of any voltage applied thereto will be transmitted through the phase AND circuit to its output terminal. The output terminal of the phase AND circuit 34 is connected to terminal 161 of the delay network 38.

One terminal of a capacitor 148 of network 38 is connected to a positive bus 150 which, as indicated by the reference character 78, is connected to the 22 volt positive connection 78 of the power supply 81. The other terminal of the capacitor 148 is connected to a common terminal 152 between a pair of series connected resistors 154 and 156. The opposite terminal 157 of the resistor 154 is connected through another resistor 158 to the positive bus 150 in shunt with the capacitor 148. A temperature compensating resistance network 160 may be connected in series between the terminal 157 and the resistor 158. This resistance network 160 comprises a positive temperature characteristic resistor shunted by a negative temperature characteristic resistor such as a thermistor resistor. The terminal 161 of the resistor 156 spaced from a terminal 152 is connected to the negative bus 162 through a resistor 164. With no potential being supplied to the input terminal 161, the capacitor 148 will be charged to a potential intermediate that of the busses 150 and 162 as determined by the relative values of the resistors of the delay network 38.

The potential supplied by the squaring amplifiers 14 and 32 to the phase AND networks 34 and 36 is derived from and is substantially the same as that of the positive potential supply terminal 78 to which the bus 150 is connected, therefore whenever a potential is supplied to the input terminal 161 from the phase AND circuit 34, the capacitor 148 starts to discharge through the shunting resistors 154, 158 and 160. The values of these resistors 154, 158 and 160 is preferably chosen with respect to the value of the capacitor 148 so that the capacitor 148 will completely discharge during the timing out of the delay network 20. For a purpose which will be made clear below, the value of the resistors 156 and 164 are so chosen that the capacitor 148 will receive a critical charge in a very short interval as for example 4 milliseconds (90 degrees at a 60 cycle per second frequency). Typical values of the magnitudes of the resistors in ohms for a 22 volt potential at terminal 78 are as follows: resistor 154—22K; 156—4.7K; 158—5.6K; 160—15K and a 1D101 thermistor; and 164—47K.

The terminal 157 is the output terminal of the delaying network 38 and is connected to the input terminal 165 of the flip-flop or switching network 42. The network 42 comprises a pair of transistors 166 and 170 and circuitry which is arranged such that when the network 42 is sensitized, conducting of transistor 166 causes the normally conducting transistor 170 to block but when the network 42 is desensitized the transistor 170 continues to conduct. The base of the transistor 166 is connected to the input terminal 165. The emitter is connected to bus 150 through a resistor 168 which may be variable if desired and which resistor determines the extent of the charge on the capacitor 148 which is necessary to cause the transistor 166 to conduct. The collector is connected to the negative bus 162 through a resistor 182 and to a control terminal 174 through a resistor 180 of an RC network. The terminal 174 is connected to the base of the normally conducting transistor 170. The emitter of this transistor 170 is connected to the positive bus 150 through the resistor 168 and the collector is connected to negative bus 162 through a resistor 172. The potential of the terminal 174 and of transistor 170 is determined jointly by a potential dividing network 176, comprising the resistors 178, 180 and 82 and a second dividing network comprising the resistors 178, 186, 188 and 189. The values of the resistors of the voltage dividing network 176 and of the resistor 168 are so chosen that, with no current flowing through the transistor 166, the potential of the terminal 174 is sufficiently below that of the emitter of transistor 170 that the transistor 170 will remain conductive. In order to further insure continued conduction of the transistor 170 if the transistor 166 should conduct when no internal fault is present, the values of the resistors 178, 186 and 188 are so chosen that, with the desensitizing input terminal 184 deenergized, the potential of the terminal 174 is sufficiently low to prevent blocking of the transistor 170 even though the transistor 166 should conduct. Typical magnitudes of the resistance in ohms of the resistors are as follows: 168—1K; 172—4.7K; 178—10K; 180—22K; 182—4.7K; 186—4.7K; 188—6.8K and 189—10K.

As will be explained below, the shunt connection through the resistors 186 and 188 and diode 190 of desensitizer network 46 will exist until the occurrence of a fault, either internal or external, and the resulting timing out of the delay 20 to operate the relay 18, before which operation the flip-flop network 42 cannot render the transistor 170 blocked due to transients or otherwise. As will be made clear below, the transistor 218 is held nonconductive until the occurrence of, and for a predetermined time period subsequent to the occurrence of a fault external or internal. During this predetermined time period there will be no current flow through resistor 186 since the potential of the terminal 191 intermediate the diode 190 and resistor 188 will be at or above the potential of the bus 150. This condition permits the potential of the terminal 174 to become sufficiently positive so that conduction of transistor 166 and the consequential increase in potential drop across resistor 168 will cause a lowering of the potential of the emitter of transistor 170 below that of its base and the consequent blocking of the transistor 170. If the transistor 166 does not conduct during this predetermined interval because the fault is external rather than internal, the transistor 218 will conduct and the resulting current flow will lower the potential of terminal 174 (desensitize the flip-flop 42) sufficiently to prevent blocking of transistor 170 because of conduction of transistor 166.

The collector of the transistor 170 is connected to a bus 192, the potential of which will primarily be determined by the conductive condition of the transistor 170. This bus 192 is the output connection of the flip-flop 42 and is connected through a current limiting resistor to the base of a transistor 194 of the AND amplifier 44. When transistor 170 conduits, the potential of the bus 192 and of the base of this transistor 194 is sufficiently close to that of the positive bus 150 so that the potential therebetween is less than the breakover potential of the breakover device or Zener diode 196 and transistor 194 will be maintained nonconductive. A suitable breakover voltage for this diode could be 6.8 volts.

The input terminal 200 of the delay network 40 is connected to the output terminal 198 of the phase AND network 36. This delay network includes a timing element or capacitor 214 which controls the initiation of conduction of a normally nonconducting transistor 202. The base of the transistor 202 is connected through a resistor 204 and a diode 206 to one terminal 213 of the timing capacitor 214. The emitter of the transistor 202 is connected through a voltage breakover device or Zener diode 210 to the other terminal 215 of the capacitor 214 and to the positive bus 212 which is energized by the power supply as indicated by the commonly identified terminals 78. A resistor 216 is connected in shunt with the capacitor 214 to discharge the same at a controlled rate. The charged condition of the timing capacitor 214 is controlled by the phase AND circuit 36 and the conductive condition of the transistor 218, and is connected to remain below a critical charge as long as the output terminal is energized by the phase AND network 36 but to progressively charge through the resistor 252 and transistor 218 of the desensitizer during the half cycles that the terminal 198 is not energized by the phase AND network 36. In order to control the rate at which the capacitor 214 charges to its critical charge a pair of resistors 220 and 222 are connected in shunt with the timing capacitor 214 and resistor 216 through a diode 208. It will be apparent that the current flow through the resistor 52 is the sum of the charging current of the timing capacitor and the current through the resistor 220.

Therefore a change in the magnitude of the resistance of the resistor 220 results in a change in the rate at which the capacitor 214 can attain its critical charge. Preferably the time required for the capacitor 214 to attain its critical charge is longer than a single time period provided by the phase AND network 36 and which may be and preferably is as short as one and one half time periods when such time periods are consecutive. For a 60 c.p.s. network 1, suitable values of capacitance of the capacitor would be 1.0 m.f.d. and of the resistors in ohms would be as follows: 216—120K; 220—50K; 222—10K; and 252—22K. The breakover voltage of the device 210 may be 6.8 volts. The diode 208 prevents discharging of the capacitor 214 other than through the resistor 216. Since the transistor 218 is a normally blocked device no charge will normally be imparted to the capacitor 214 during standby condition.

It is believed that the remainder of the details of construction may best be understood by a description of the operation of the device which is as follows: under normal faultless operating conditions of network 1, relays 16 and 18 will be deenergized. If load current is sufficiently high, an a-c quantity will be supplied to the local squaring amplifier 14 and through the phase AND network 34 to the delay network 38. The capacitor 148 will be alternately charged and discharged but because of the desensitized condition of the flip-flop 42 will not result in the blocking of the transistor 170 even though the transistor 166 may do some conducting. The normally closed contacts 16a of relay 16 will maintain transistor 114 of the transmitter keying circuit conductive and will prevent any operation of the transmitter 24 by the HKB network 6.

Upon the occurrence of a fault in the distribution network 1 the HKB network 6 will supply an alternating potential quantity of fault magnitude through the low pass filter to the phase shift network 12. A direct current potential of fault magnitude is supplied to the relay 16 which becomes energized to open its contacts 16a without substantial time delay. The D.-C. potential is supplied to the relay 18 through the time delay network 20 which commences to time out. When the relay 16 opens its normally closed contacts (FIG. 8), it interrupts the circuit between the terminal 132 and the ground bus 80 to permit the potential of terminal 120 of the power supply 81 to rise and supply potential to place the transmitter 24 under control of the keying circuit 22. Opening of the contacts 16a also interrupted the base circuit to ground through the diode 128. This interruption places the control of transistor 114 under control of the output signal of the phase shift network 12. The transistor 114 will be rendered nonconductive during each of alternate half cycles whereby the transistor 118 is periodically rendered conducting to cause the transmitter 24 to transmit a signal to the receiver of the remote device 4B only during the periods in which the transistor 118 is blocked.

When the time delay device 20, indicated in FIG. 9 as being a capacitor connected in shunt with the operating coil of the relay 18, has timed out, the relay 18 will close its normally open contacts 18a and 18b (FIG. 9). Closure of the contacts 18b is merely preparatory and has no immediate effect.

Closure of the contacts 18a (FIG. 10) elevates the potential of the terminal 184 of the desensitizing network 46 and terminal 230 of the delay network 48 (FIG. 10). Elevation of the potential of the terminal 184 to substantially 22 volts effectively elevates the potential of the terminal 174 of the flip-flop network 42 whereby conduction of the transistor 170 is under control of the transistor 166. If, during the timing out interval of the delay 20, the receiver 30 does not receive a signal to cause the remote squarer 32 to energize the phase AND network 34 during the time interval that no signal is being supplied thereto by the local squarer 14 the capacitor 148 will remain or be charged to its critical value so that the transistor 166 will either continue to be conducting or become conducting. Since closure of contacts 18a sensitizes the flip-flop 42 and transistor 166 is conducting, the transistor 170 will become blocked. Blocking of the transistor 170 reduces the potential across the resistor 172 whereby the potential of bus 192 approaches that of the negative bus 80. This increases the potential difference between the base and emitter of the transistor above the break-over voltage of the device 196 and transistor 194 becomes conductive. This conduction causes base drive current to flow through the transistor 250 which is thereby rendered conductive.

Closure of the contacts 18a also completed the potential supplying circuit of the collector-emitter circuit of the transistor 250 (second input of AND portion of AND amplifier 44) so that the rendering of the transistor 250 conductive energizes the trip relay 50 which closes its contacts 50a to actuate the coil of relay 224 which closes its contacts 224a and 224b.

Closure of the contacts 224a energizes the terminal 126 of the squelch network whereby the transistor 122 thereof conducts to prevent further actuation of the transmitter 24 under control of the transmitter keying network 22. The squelch network is provided with a timing capacitor 254 which will maintain the transistor 122 thereof conducting for a predetermined time interval as for example 150 milliseconds after deenergization of the relay 224. This is for the purpose of giving the remote relaying device 4B an opportunity to actuate should the fault current signal not increase sufficiently until after operation of the local breaker 2A.

Closure of contacts 224b closes a sealing circuit for the relay 224 and energizes the trip coil 52 of the breaker 2A. When trip coil 52 is energized it opens the breaker 2a and its associated a contacts which open the energizing circuit of the trip coil 52 and opens the sealing circuit of the relay 224.

If the fault is external to the line section 1C, the receiver 30 will be energized by the remote transmitter of the device 4B to actuate the remote squaring amplifier 32 to cause the phase AND network 34 to provide a continuous or substantially continuous output. This results in the maintaining of the potential of the terminal 161 at substantially the same potential as that of the bus 150 and substantially continually so. This results in the discharging of the capacitor 148 below its critical value during the time interval that the delay network 20 is timing out. Therefore, unlike the case of the internal fault, the transistor 166 will not be conducting upon energization of the relay 18 and the sensitizing of the flip-flop network 42 and the breaker 2A will not be actuated to open conditions.

If the flip-flop 42 remained sensitized subsequent transients which may accompany the clearing external faults could falsely actuate the relay device 4A and unnecessarily and undesirably disconnect the line sections 1C from section 1A. To avoid this, the flip-flop 42 is again desensitized at the end of a desired time interval as determined by the delay network 48. The timing out of this network 48 is initiated by closure of the relay contacts 18a which elevated the potential of its control terminal 230. This elevation is sufficient to cause a breakover of the device 231 and base current to flow in the transistor 232 of the delay network 48. Consequent conduction of transistor 232 terminates the conduction of the companion transistor 234. During the interval that the transistor 234 was conducting, it maintained the timing capacitor 236 discharged. The blocking of the transistor 234 initiates the charging of the capacitor 236 through a circuit which extends from the conductor 192 through the voltage breakover device 238, diode 240, resistor 242 and capacitor 236 to the negative bus 162. The capacitor 236 reaches its critical charge at the end of the timing interval of the time delay 48. When this occurs, the voltage breakover device 244 will breakover and base drive current will flow through the base of the transistor 218 causing it to conduct and complete a circuit from the terminal 174 through resistor 189 and diode 248 to the negative bus 162. This current flow reduces the potential of the terminal 174 as described above and desensitizes the flip-flop so that the transistor 170 is no longer controlled by the conductive condition of the transistor 166. The interval that the timing device or capacitor 236 is being charged represents the initial interval in which the flip-flop network or switching network 46 can respond to the output of the phase AND circuit 34 for tripping the end amplifier 40.

In the event an internal fault occurs subsequent to the occurence of an external fault and of the timing out of the delay network 48, the flip-flop circuit 42 is resensitized at the end of a predetermined time delay as provided by the delay network 40. This delay network 40 provides a time delaying interval which is longer than any expected transient which might falsely trip the relay device and assures that the apparent internal fault is a true internal fault. The network 40 times out in response to a change in the relative phase of the output voltages applied to the phase AND network 36 by the squarers 14 and 32.

During the external fault, the phase angle of the outputs of the squaring amplifiers 14 and 32 was such that either the terminal 82 or the terminal 144 was at a positive potential at substantially the entire time so that the potential of the output terminal 198 was substantially always maintained at the elevated potential. This elevation in potential prevented charging current flow to the timing capacitor 214. Upon the occurrence of the subsequent internal fault, the direction of fault current flow through the transformer array 8B reverses and shifts the phase of the output voltage supplied by the HKB network 6 of the relaying device 4B. Therefore when this internal fault occurs, the phase of the output voltage of the remote squaring amplifier is shifted to substantially that of the local squaring amplifier whereby the potential of the terminal 198 is elevated for only a portion of the cycle of the voltage of the protected network which portion is usually 180° of the alternating output of the HKB networks 6. The capacitor 214 will receive charging current from the positive bus 212 when the phase AND network 36 does not supply substantially 22 volts to the terminal 200 of the delay network 40. The charging circuit of the capacitor 214, extends from the terminal 78, through the capacitor 214, the diode 208, resistor 252, collector to emitter of the transistor 218 and the negative bus 162 to the negative terminal 80 of the power supply 81. Since, as set forth above, the capacitor 214 cannot be charged to its critical potential during the cycle portions in which the terminal 200 is not elevated, the desensitizer 46 is not actuated at this time. During the next cycle portion in which the terminal 200 is elevated in potential, only a portion of the charge supplied is discharged so that during the second cycle portion in which the terminal 200 is not elevated in potential, the increment of charge received is sufficient to raise the stored charge to the initial value which will cause the breakover device 210 to breakover and render the transistor 202 to conducting.

When the transistor 202 conducts, it elevates the potential of the base of the nonconducting transistor 234 of the delay network 48 causing it to become conducting and discharge the timing capacitor 236. The discharging of transistor 236 occurs very rapidly. When the potential across the capacitor 236 has been reduced substantially to a potential just below the breakover potential of the device 244 it ceases to conduct and terminates further flow of base current to the transistor 218. This causes the potential of the terminal 174 to elevate and return the control of transisetor 170 to the transistor 166.

At the same time that the phase AND network 36 was actuating the delay network 40, the phase AND network 34 was timing out the delay network 38. The timing of the delay 38 is preferably of shorter duration than that of the delay network 40 so that by the time that the flip-flop 42 is resensitized the delay network 38 will have timed out and the transistor 170 will block when the flip-flop 42 is sensitized. As explained above, the rendering of the transistor 170 blocked lowers the potential of the conductor 192, and the transistors 194 and 250 conduct and energize the trip relay 50, relay 224 and energize the trip coil 52 to trip the breaker 2A as described above.

Although the invention has been described with reference to a single embodiment thereof, numerous modifications are possible and it is desired to cover all modifications falling within the spirit and scope of the invention.

What is claimed and is desired to have secured by United States Letters Patent is as follows:

1. In a relaying network for protecting a line section against internal faults in which sensing means is provided to sense the direction of flow of an electrical quantity at spaced portions of the section and in which said sensing means has a pulsing output, the phase of which is dependent upon the direction of flow of said quantity, the combination of first and second phase sensing networks, first and second delaying networks, said first delaying network having a signal of predetermined magnitude at the termination of its timing period, a switching apparatus including magnitude determining means for determining the magnitude of a control signal which is required to actuate said switching apparatus, means connecting said first delay network to said switching apparatus for actuation of said apparatus thereby, a sensitizing circuit connected to said switching apparatus and effective to actuate said magnitude determining means, said sensitizing circuit having a first operating condition for actuating said magnitude determining means to provide that said required magnitude of said control signal to be of a first signal magnitude and a second operating condition in which said required magnitude of said control signal is said predetermined signal magnitude, first means for energizing said first and second phase sensing networks with a first signal pulsing at a predetermined rate, second means for energizing said first and second phase sensing networks with a second signal pulsing at said predetermined rate, said first and second phase sensing networks being connected individually to said first and second delaying networks respectively and effective to cause the respective said delaying network to time out solely when the relative phase of said first and second signals is within a predetermined magnitude, third means connecting said second delay network to said sensitizing circuit whereby said sensitizing circuit is actuated from one of its said conditions to the other of its said conditions as a consequence of the timing out of said second delaying network.

2. In a relaying network for protecting a line section against internal faults in which sensing means is provided to sense the direction of flow of an electrical quantity at spaced portions of the section and in which said sensing means has a pulsing output the phase of which is dependent upon the direction of flow of said quantity, the combination of first and second phase sensing networks, first and second delaying networks, said first delaying network having a signal of predetermined magnitude at the termination of its timing period, a switching apparatus including magnitude determining means for determining the magnitude of a control signal which is required to actuate said switching apparatus, means connecting said first delay network to said switching apparatus for actuation of said apparatus thereby, a sensitizing circuit connected to said switching apparatus and effective to actuate said magnitude determining means, said sensitizing circuit having a first operating condition for actuating said magnitude determining means to provide for said required magnitude of said control signal to be of a first signal magnitude and a second operating condition in which said required magnitude of said control signal is said predetermined signal magnitude, first means for energizing said first and second phase sensing networks with a first signal pulsing at a predetermined rate, second means for energizing said first and second phase sensing networks with a second signal pulsing at said predetermined rate, said first and second phase sensing networks being connected individually to said first and second delaying networks respectively and effective to cause the respective said delaying network to time out solely when the relative phase of said first and second signals is within a predetermined magnitude, third means connecting said second delay network to said sensitizing circuit whereby said sensitizing circuit is actuated from one of its said conditions to the other of its said conditions, said fourth means being effective to actuate said sensitizing circuit into its said first condition irrespective of the actuation thereof by said third means.

3. In a relaying network for protecting a line section against internal faults in which sensing means is provided to sense the direction of flow of an electrical quantity at spaced portions of the section and in which said sensing means has a pulsing output the phase of which is dependent upon the direction of flow of said quantity, the combination of first and second phase sensing networks, first and second and third delaying networks, said first delaying network having a signal of predetermined magnitude at the termination of its timing period, a switching apparatus including magnitude determining means for determining the magnitude of a control signal which is required to actuate said switching apparatus, means connecting said first delay network to said switching apparatus for actuation of said apparatus thereby, a sensitizing circuit connected to said switching apparatus and effective to actuate said magnitude determining means, said sensitizing circuit having a first operating condition for actuating said magnitude determining means to provide for said required magnitude of said control signal to be of a first signal magnitude and a second operating condition in which said required magnitude of said control signal is said predetermined signal magnitude, first and second switching devices, first means including said first switching device for energizing said first and second phase sensing networks with a first signal pulsing at a predetermined rate, second means for energizing said first and second phase sensing networks with a second signal pulsing at said predetermined rate, said first and second phase sensing networks being connected individually to said first and second delaying networks respectively and effective to cause the respective said delaying network to time out solely when the relative phase of said first and second signals is within a predetermined magnitude, third means including said third delaying network and said second switching device for actuating said sensitizing circuit from its said first condition into its said second condition, and fourth means connecting said second delaying network to said sensitizing circuit whereby said sensitizing circuit is actuated from its said second condition to its said first condition as a consequence of the timing out of said second delaying network, said fourth means being effective to hold said sensitizing circuit in its said first condition irrespective of the actuation thereby by said third means.

4. In a relaying network for protecting a line section against internal faults in which sensing means is provided to sense the direction of flow of an electrical quantity at spaced portions of the section and in which said sensing means has a pulsing output the phase of which is dependent upon the direction of flow of said quantity, the combination of first and second phase sensing networks, first and second and third delaying networks, said first delay network having a signal of predetermined magnitude at the termination of its timing period, a switching apparatus including magnitude determining means for determining the magnitude of a control signal which is required to actuate said switching apparatus, means connecting said first delay network to said switching apparatus for actuation of said apparatus thereby, a sensitizing circuit connected to said switching apparatus and effective to actuate said magnitude determining means, said sensitizing circuit having a first operating condition for actuating said magnitude determining means to provide for said required magnitude of said control signal to be of a first signal magnitude and a second operating condition in which said required magnitude of said control signal is said predetermined signal magnitude, first and second switching devices, first circuit means connecting said switching devices to one of said flow direction sensing means, said first circuit means including said third delaying network in circuit with said second switching device whereby said first switching device is actuated prior to said second switching device, second circuit means controlled by said first switching device and connected to energize said first and second phase sensing networks with a first signal pulsing at a predetermined rate, third circuit means controlled by the other of said flow direction sensing means and having an output circuit connected to energize said first and second phase sensing networks with a second signal pulsing at said predetermined rate, said first and second phase sensing networks being connected individually to said first and second delaying networks respectively and effective to cause the respective said delaying network to time out solely when the relative phase of said first and second signals is within a predetermined magnitude, fourth circuit means controlled by said second switching device for actuating said sensitizing circuit from its said first condition into its said second condition, and fifth circuit means connecting said second delay network to said sensitizing circuit whereby said sensitizing circuit is actuated from its said second condition to its said first condition, said fifth circuit means being effective to actuate said sensitizing circuit into its said first condition irrespective of the actuation thereof by said fourth circuit means.

5. In an apparatus of the character described, first and second pulsating electrical quantities, a switching network having first and second operating conditions and actuated from said first to said second condition in response to the application thereto of a critical signal, first means connected to said switching network and energized from said quantities and effective to provide said critical signal solely when the relative phase of said quantities is of a first value, a desensitizing network connected to said switching network and operable to render said switching network effective and ineffective to respond to said critical signal, and network means energized by said quantities and connected to said desensitizing network, said network means being effective whenever the relative phase of said quantities is other than said first value to cause said desensitizing network to render said switching network ineffective to respond to said critical signal.

6. The combination of claim 5 in which said network means includes time delay means for delaying the causing of said desensitizing means to render said switching network effective to respond to said critical signal until the relative phase of said quantities has been of said first value for a predetermined interval.

7. The combination of claim 5 in which said first means includes a time delaying device for preventing the application of said critical signal until the expiration of a first predetermined interval after the relative phase of said quantities is of said first value.

8. The combination of claim 7 in which said network means includes time delay means for delaying the causing of said desensitizing means to render said switching network effective to respond to said critical signal until the relative phase of said quantities has been of said first value for a second predetermined interval, said second predetermined interval being greater than said first predetermined interval.

9. The combination of claim 8 in which there is provided means normally effective to maintain said desensitizing means operable to render said switching network in its said ineffective condition, a switching device connected to said desensitizing means for rendering said desensitizing means in its said effective conditions, and timing means actuated by said switching device to render said desensitizing means in its said ineffective conditions.

10. Circuit interrupter control apparatus for protecting a section of a transmission line having one of the end portions of the section connected to another portion of such line through circuit interrupter comprising, a switching network operable to be transferred from a first condition to a second condition in response to the application thereto of a critical potential, a desensitizing network connected to said network and normally operable to render said switching network ineffective to respond to said critical potential whereby said network is prevented from being rendered into its said second condition, a pair of control terminals, first and second switching devices, a plurality of delay networks, first circuit means connecting said first switching device to said terminals, second circuit means connecting said second switching device to said terminals and including a first of said delay networks, first and second alternating potential sources, first and second phase sensitive circuits, second circuit means connecting said first and second sources to said switching network and including said first phase sensitive circuit and a second of said delay networks, said second circuit means being effective to initiate the timing out of said second delay network solely when the phase angle of said sources is below a maximum phase angle said second circuit means further being effective to supply said critical potential as a consequence of the timing out of said second delay network, third circuit means connecting said first and second sources to said desensitizing network and including said second phase sensitive circuit and a third of said delay networks, said third circuit means being effective to initiate the timing out of said third delay network solely when the phase angle of said sources is below said maximum angle, said third circuit means further being effective to cause said desensitizing network to render said switching network effective to respond to said critical potential, a fourth circuit means connecting said second switching device to said desensitizing network, said fourth circuit means being effective upon actuation of said second switching device to render said switching network effective to respond to said critical potential, and a fifth circuit means connecting said second switching device to said desensitizing network and including a fourth of said delay networks, said fourth delay network being effective upon said actuation of said second switching device to time out its timing interval, said fifth circuit means being effective at the end of said timing interval of said fourth delay network to render said switching network ineffective to respond to said critical potential whereby said switching network is held effective to respond to said critical potential solely for said timing interval of said fourth delay network when said phase angle of said sources exceeds said maximum angle.

11. The combination of claim 10 in which said third circuit means includes said fourth delay network.

12. The combination of claim 10 in which there is provided a second current interrupter control apparatus for controlling a second interrupter which connects a second end portion of the line section to a further portion of such line, said second current interrupter control apparatus being substantially identical to the first described interrupter control apparatus, said first interrupter control apparatus further including a first transmitter and a first receiver, said second interrupter control apparatus further including a second transmitter and a second receiver, said first interrupter control apparatus including circuit means actuated by its said first switching device for rendering said first transmitter effective and including circuit means connected between its said second source and said first receiver and effective to energize said first mentioned second source when said first receiver is energized by said second transmitter, said second interrupter control apparatus including circuit means actuated by its said first switching device for rendering said second transmitter effective and including circuit means connected between its said second source and said second receiver and effective to energize said last-mentioned second source when said second receiver is energized by said first transmitter.

13. The combination of claim 12 in which each of said receivers are effective to be actuated by both of said transmitters and in which said first sources are individually energized by said first and second transmitters.

14. In combination, a flip-flop network having a pair of electric valves, each said valve including a main circuit and a control circuit, said network further including circuitry such that when a first of said valves conducts the second of said valves is rendered nonconductive, said network further including controlling means having a first condition for rendering said first valve ineffective to render said second valve nonconductive and a second condition for rendering said first valve effective to render said second valve nonconductive, a plurality of timing networks, first and second OR networks, each said OR network having an output connection and a pair of input connections either of which input connection is operable to energize said output connection, first means connecting said output connection of said first OR network to said control circuit of said first valve and including a first of said timing networks, said first network being operable to cause said first valve to conduct when said first timing network times out, said first timing network initiating its timing out functions in the absence of an output signal from said OR circuit, second means normally maintaining said controlling means in its said first condition and actuatable to place said controlling means in its said second condition, third means connected to said controlling means and including a second of said timing networks, said third means being effective upon the timing out of said second timing network to place said controlling means in its said first condition irrespective of the operation of said second means, initiating means operable to initiate the timing out of said second timing network concurrently with the actuation of said second means whereby said controlling means is actuated from its said first condition into its said second condition and back into its said first condition in a predetermined first time interval as determined by said second timing network, said timing interval of said first timing network being less than said predetermined time interval, fourth means connecting said output connection of said second OR network to said third means and including a third of said timing networks, said fourth means being effective upon the timing out of said third timing means to maintain said third means ineffective to place said controlling means in its said first condition, the timing interval of said third timing network being greater than the timing interval of said first timing network, means connecting a first of said input connections of said OR networks to a first source of pulsating potential, and means connecting the second of said input connections of said OR networks to a second source of pulsating potential.

15. In combination, a plurality of capacitors, a plurality of valves, each said valve having a main circuit and a control circuit, means connecting said main circuit of first of said valves in shunt with a first of said capacitors, first control means connected to said control circuit of said first valve, means connected to said control circuit of said first valve and normally effective to maintain said first valve conductive and thereby first capacitor discharged, a pair of potential supplying terminals, first and second impedance elements series connected together to provide a common terminal and spaced end terminals, said end terminals being individually connected to said potential supplying terminals, means connecting said main circuit of a second of said valves in shunt with said second impedance element, means connecting said control circuit of said second valve to said first capacitor in such polarity that said second valve is rendered conductive when said first capacitor is charged to a critical value and vice versa, second control means connected to said control circuit of said first valve and including said main circuit of a third of said valves, said second control means being effective independently of said first control means to render said first valve conductive when said third valve conducts, and third control means connected to said control circuit of said third valve and including a second of said capacitors, said third control means including a device to control the rate of change of the energy stored in said second capacitor, said third control means being effective as a consequence of the attainment by said second capacitor of a critical magnitude of said stored energy to render said third valve conductive.

16. The combination of claim 15 in which said means which connects said control circuit of said second valve to said first capacitor includes a voltage breakover device for controlling the magnitude of said critical value required to render said second valve conductive and in which said device of said third control means includes said main circuit of said second valve.

17. A control apparatus for controlling the critical control potential required to actuate an electric switch, first and second potential supplying busses, a first circuit connected between said busses and including first and second and third elements connected in series and in the recited order between said first and said second busses, a plurality of electric valves, each said valve having a main circuit and a control circuit, a plurality of voltage breakover devices, second circuit means connected to said first circuit between said first and said second elements and said second bus and including said main circuit of a first of said valves, a plurality of capacitors, a third control circuit connected to said control circuit of said first valve, and including a first of said capacitors and a first of said breakover devices, fourth circuit means connecting said main circuit of a second of said valves in shunt circuit with said first capacitor, said second valve being effective when conductive to discharge said first capacitor, a fifth circuit connected to said control circuit of said second valve and normally effective to maintain said second valve conductive, a switching device connected to said fifth circuit and effective when actuated to actuate said fifth circuit to render said second valve nonconductive, sixth circuit means connected to charge said first capacitor and including a fourth impedance element, said sixth circuit means being effective to charge said first capacitor to the breakover potential of said breakover device in a first predetermined time interval subsequent to the rendering of said second valve nonconducting, seventh circuit means connected to charge a second of said capacitors and including said main circuit of said first valve, eighth circuit means connected to said control circuit of said second valve and including said main circuit of a third of said valves, ninth circuit means connecting said control circuit of said third valve to said second capacitor and including a second of said breakover devices, said ninth circuit means being effective when charged to a predetermined potential to render said third valve conductive whereby said second valve is rendered conductive to discharge said first capacitor below said breakover voltage of said first breakover device, tenth circuit means connected to said seventh circuit means intermediate said second capacitor and said first valve and including a phase sensitive circuit, said tenth circuit means being operable in a first condition to prevent the charging of said second capacitor and operable in a second condition to permit charging of said second capacitor to its said predetermined potential in a second predetermined time interval, and first and second sources of pulsating voltage, said phase sensitive circuit being operable to place said tenth circuit in its said first condition when the phase angle of said sources is greater than a predetermined angle and in its said second conditions when said phase angle does not exceed said predetermined angle.

18. In combination, first and second potential supplying busses, a plurality of transistors each having a main current path and a base connection, a plurality of resistors, a plurality of capacitors, a plurality of potential breakover devices, a plurality of diodes, a first circuit connected between said first and second busses and including in series connection and in the order named a first of said resistors and said main path of a first of said transistors and a second of said resistors, a second circuit connected between said first and second busses and including in series connection and in the order named said first resistor and said main path of a second of said transistors and a third of said resistors, a third circuit connected between said first and second busses and including in series connection and in the order named a fourth and a fifth and a sixth of said resistors, a first of said diodes being connected in said third circuit between said fifth and sixth resistors and polarized to permit current flow from said first to said second bus, a fourth circuit connected between said first and second busses and including in series circuit and in the order named a first of said capacitors and a seventh and an eighth of said resistors, a fifth circuit connected in shunt with said first capacitor and including a ninth and a tenth of said resistors, means connecting said base of said first transistor to said fifth circuit intermediate said ninth and said tenth resistors and to said second circuit intermediate said second transistor and said third resistor through an eleventh of said resistors and a second of said capacitors, said eleventh resistor being connected in shunt with said second capacitor, a source of potential, a sixth circuit connecting said source of potential to said third circuit intermediate said first diode and said sixth resistor and including in series connections in the order named a switch and a second of said diodes and a twelfth of said resistors, a seventh circuit connected between said first and second busses and including in series connections in the order named a thirteenth of said resistors and said main path of a third of said transistors, means connecting said base connection of said third transistor to said third circuit intermediate said first diode and said sixth resistor and including a first of said breakover devices and a fourteenth of said resistors, an eighth circuit connected between said first and second busses and including in series circuit in the order named a fifteenth and a sixteenth of said resistors and said main paths of a fourth of said transistors, a ninth circuit connecting said base of said fourth transistor to said second circuit intermediate said second transistor and said third resistor and including in series circuit and in the order named a second of said breakover devices and a seventeenth of said resistors, said ninth circuit being provided with a connection intermediate said second breakover device and said seventeenth resistor, said ninth circuit further including in series circuit a third of said diodes and a third of said breakover devices in series circuit with said seventeenth resistor and intermediate said second circuit and said connection, a third of said capacitors connected between said connection and said second bus, a tenth circuit connected between said connection and said second bus and including in series connection in the order named an eighteenth of said resistors and said main path of a fifth of said transistors, a nineteenth of said resistors connected between said base of said fifth transistor and said seventh circuit intermediate said third transistor and said thirteenth resistor, an eleventh circuit connected between said first bus and said base of said fifth transistor and including in series circuit in the order named a fourth of said breakover devices and said main path of a sixth of said valves and a twentieth of said resistors, a fourth of said capacitors connected between said base of said sixth transistor and said first bus, means connecting the portion of said fourth capacitor which is connected to said base of said sixth transistor to said eighth circuit intermediate said fifteenth and said sixteenth resistors, first and second input terminals, a fourth and a fifth of said diodes individually and respectively connecting said first and second input terminals to said fourth circuit intermediate said seventh and said eighth resistors, and a sixth and a seventh of said diodes individually and respectively connecting said first and second terminals to said eighth circuit intermediate said fifthteenth and said sixteenth resistors.

No references cited.

MILTON O. HIRSHFIELD, *Primary Examiner.*

J. D. TRAMMELL, *Assistant Examiner.*